Patented May 13, 1952

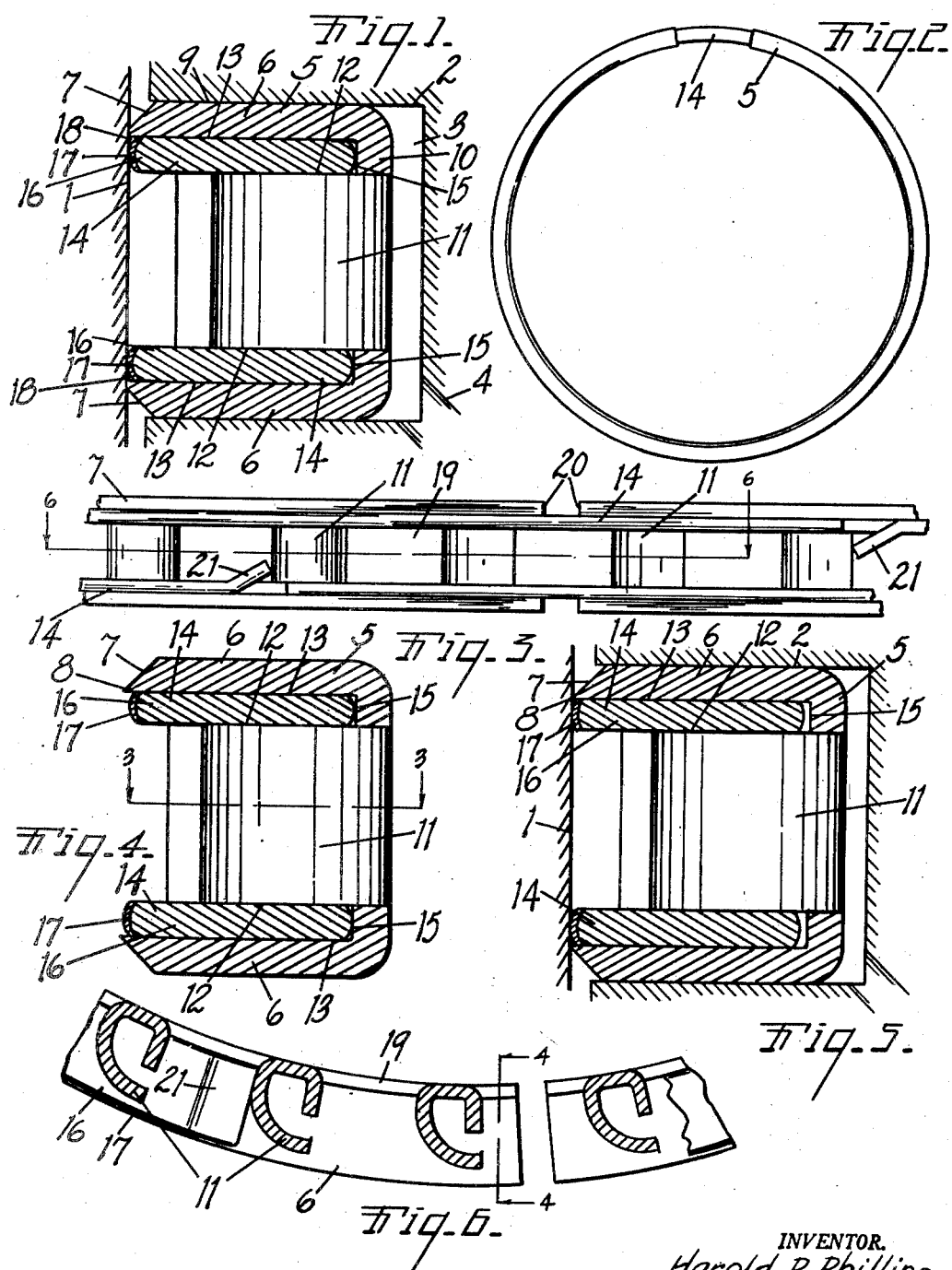

2,596,286

UNITED STATES PATENT OFFICE 2,596,286

PISTON RING ASSEMBLY AND ELEMENTS THEREOF

Harold P. Phillips, Hastings, Mich., assignor to Hastings Manufacturing Company, Hastings, Mich.

Application May 7, 1951, Serial No. 224,986

9 Claims. (Cl. 309—44)

1

This invention relates to improvements in piston ring assemblies and elements thereof.

The main objects of this invention are:

First, to provide a piston ring assembly which is highly efficient even during the wear-in period and is very durable.

Second, to provide a piston ring assembly which may be completely assembled as a unit for merchandising and installation.

Third, to provide a piston ring assembly which may be formed completely of ribbon or sheet steel stock, is light in weight and at the same time strong and durable.

Fourth, to provide a piston ring and segment support and spacer element adapted for use with thin split ring segments providing effective support therefor, the ring element having cylinder wall engaging portions facilitating quick wear-in and effective sealing during the wear-in period.

Objects relating to details and economies of the invention will appear from the description to follow. The invention is pointed out in the claims.

A preferred embodiment of the invention is illustrated in the accompanying drawing, in which:

Fig. 1 is an enlarged fragmentary vertical section of a piston ring assembly embodying my invention installed in a piston ring groove of a piston and in operative relation to the cylinder wall, the ring assembly parts being shown in their relation after the preliminary or wearing in period, and no attempt being made to show the cylinder and piston or the ring assembly parts in their relative proportions or to show clearances or tolerances between the parts, the view being illustrative.

Fig. 2 is a side elevational view of the ring assembly.

Fig. 3 is an enlarged edge view as viewed from the top of Fig. 2.

Fig. 4 is an enlarged cross sectional view on a line corresponding to line 4—4 of Fig. 6, illustrating the relation of the ring assembly parts prior to the assembly in a piston cylinder.

Fig. 5 is a fragmentary view on a line corresponding to 4—4 of Fig. 6 showing the parts as initially assembled in an engine and prior to the wearing in period as shown in Fig. 1.

Fig. 6 is a fragmentary view on a line corresponding to line 6—6 of Fig. 3.

My present invention is an adaptation of and in some respects an improvement upon the invention of my application for Letters Patent filed May 7, 1951, Serial No. 224,985.

2

In the accompanying drawing, 1 represents a cylinder and 2 a piston having a piston ring groove 3 therein provided with a drain 4. No attempt has been made to show these parts in their proper proportions or with proper clearances or tolerances and as a matter of fact, these may be varied as desired. The accompanying drawing is intended to illustrate the relationship of the parts of my piston ring assembly before and after installation in an engine and after the wearing in period.

The piston ring assembly of my present invention comprises the combined spacer and ring member 5 which is of outwardly facing channel section and is formed of ductile metal, preferably ribbon steel. The flanges 6—6 of the member 5 constitute cylinder wall engaging ring elements and have outwardly beveled peripheries 7 providing sharp cylinder wall engaging edges 8, the purposes and advantages of which will be further pointed out. These flanges 6 are adapted to coact with the sides 9 of the piston ring groove 3 as is illustrated in Figs. 1 and 5. I would again point out that no attempt has been made to show clearances or tolerances between the ring assembly and the walls of the piston ring groove but it will be understood that in commercial use there are suitable clearances to permit free action of the ring assembly in the groove and that clearances and tolerances are somewhat varied to comply with specifications.

The web portion 10 of the member 5 has peripherally spaced portions 11 thereof struck outwardly between the flanges or ring elements 6 to provide spacer elements, the ends 12 of which are spaced from the elements 6 to provide grooves 13 receiving the piston ring segments 14. The portions of the web beyond the ends 12 of the spacer portions 11 provide bottoms 15 for the grooves.

The piston ring segments 14 are desirably formed of thin ribbon steel coiled edgewise. Their outer edges 16 are curved and are provided with chrome plating 17, the curvature being such that there is a substantial line contact provided for the segments 14 with the cylinder and owing to the wear resisting qualities of the chrome plating, this line contact is maintained throughout a long period of use.

In Fig. 4 I illustrate the ring members 6 and the piston ring segments 14 in their relation previous to installing in a piston ring groove and it will be noted that before installing in a cylinder the thin or sharp edges 8 of the members 6 project beyond the peripheries of the ring segments 14. Both the member 5 and the segments 14 have inherent expansibility and they are both split as is illustrated in the drawing. When the assembly shown in Fig. 4 is initially installed in a cylinder as is illustrated in Fig. 5, the ring segments 14 contact the cylinder wall as do also the peripheral edges 8 of the ring elements 6 of the member 5. In the initial installation as is shown in Fig. 5, the segments 14 do not bottom on or rest on the bottoms of the grooves. The segments 14 are, however, effectively supported in axially spaced relation by the spacer members and the ring members 6 of the member 5.

It is desirable that the member 5 receive a tempering treatment after forming. This not only serves to harden the ring elements of the member but relieves it of the forming stresses which might tend to distort; however, even when tempered the edges 8 provide for effective sealing and oil scraping or removing during the relatively rapid wear-in period. They also coact with the segments 14 in providing effective sealing and oil removing action and also they coact with the curved cylinder wall engaging portions of the members 14 to provide small annular lubricant pockets 18 so that the cylinder wall line contacting edges of the chrome plated segments 17 are effectively lubricated, notwithstanding the fact that the assembly provides a highly efficient oil control ring. The openings 19 between the spacer members 11 provide for effective drainage.

In the embodiment illustrated, the ring segments 14 are disposed in overlapping relation to each other and to the split 20 of the member 5. One end of each segment 14 is inwardly offset at 21 to engage one of the members 11. This arrangement of the parts not only bridges the joint in the member 5 but provides a snubbing action which is one feature to which my said application for Letters Patent is directed so it is not therefore further discussed herein.

With this arrangement of parts I provide a ring assembly which is highly efficient in the control of lubricant and in its sealing qualities throughout the wearing in period as well as during the continued use of the assembly. The parts of the assembly may be economically produced and assembled, are readily installed, and the combination of the assembly results in maintaining a very effective action throughout a very long period of use.

I have illustrated and described a highly practical embodiment of my invention. I have not attempted to illustrate or describe certain embodiments or adaptations which might be desirable for particular uses as it is believed that this disclosure will enable those skilled in the art to embody or adapt my invention as may be desired.

Having thus described my invention, what I claim as new and desire to secure by Letters Patent is:

1. A piston ring assembly comprising an annular split resilient combined spacer and ring member of outwardly facing channel section formed of ribbon steel and having spaced intermediate portions of the web thereof disposed outwardly between the flanges with their ends in spaced relation to the flanges and coacting therewith to provide axially spaced ring segment receiving grooves, the portions of the web between the ends of the spacer element and the flanges constituting the bottoms of the grooves, the flanges constituting cylinder wall engaging ring elements and being initially peripherally beveled to provide relatively sharp cylinder wall engaging edges facilitating the quick wear-in thereof, and thin annular split resilient cylinder wall engaging ring segments formed of ribbon steel coiled edgewise disposed in said grooves and having rounded chrome plated peripheral edges providing substantially line contact with the cylinder wall in which the assembly is installed, the radial width of the said flanges being initially greater than the radial width of the said ring segments whereby the inner peripheries of the ring segments are spaced from the bottoms of the grooves during the initial wear-in period of the assembly, the resilience of the ring segments and of the combined spacer and ring member acting to urge them against a cylinder wall in which the assembly is installed.

2. A piston ring assembly comprising an annular split resilient combined spacer and ring member of outwardly facing channel section formed of ribbon steel and having spaced intermediate portions of the web thereof disposed outwardly between the flanges with their ends in spaced relation to the flanges and coacting therewith to provide axially spaced ring segment receiving grooves, the portions of the web between the ends of the spacer element and the flanges constituting the bottoms of the grooves, the flanges constituting cylinder wall engaging ring elements, and thin annular split resilient cylinder wall engaging ring segments disposed in said grooves, the radial width of the said flanges being initially greater than the radial width of the said ring segments whereby the inner peripheries of the ring segments are spaced from the bottoms of the grooves during the initial wear-in period of the assembly, the resilience of the ring segments and of the combined spacer and ring member acting to urge them against a cylinder wall in which the assembly is installed.

3. A piston ring assembly comprising an annular split resilient combined spacer and ring member of outwardly facing channel section formed of ribbon steel and having spaced intermediate portions of the web thereof disposed outwardly between the flanges with their ends in spaced relation to the flanges and coacting therewith to provide axially spaced ring segment receiving grooves, the portions of the web between the ends of the spacer element and the flanges constituting the bottoms of the grooves, the flanges constituting cylinder wall engaging ring elements and being initially peripherally beveled to provide relatively sharp cylinder wall engaging edges facilitating the quick wear-in thereof, and thin annular split resilient cylinder wall engaging ring segments disposed in said grooves and having rounded chrome plated peripheral edges providing substantially line contact with the cylinder wall in which the assembly is installed, the radial width of the said flanges being initially greater than the radial width of the said ring segments whereby the inner peripheries of the ring segments are spaced from the bottoms of the grooves during the initial wear-in period of the assembly.

4. A piston ring assembly comprising an annular split resilient combined spacer and ring member of outwardly facing channel section formed of ribbon steel and having spaced intermediate portions of the web thereof disposed outwardly between the flanges with their ends in spaced relation to the flanges and coating therewith to provide axially spaced ring segment receiving grooves, the portions of the web between the ends of the spacer element and the flanges constituting the bottoms of the grooves, the flanges constituting cylinder wall engaging ring elements, and thin annular split resilient cylinder wall engaging ring segments disposed in said grooves and having rounded chrome plated peripheral edges providing substantially line contact with the cylinder wall in which the assembly is installed, the radial width of the said flanges being initially greater than the radial width of the said ring segments whereby the inner peripheries of the ring segments are spaced from the bottoms of the grooves during the initial wear-in period of the assembly.

5. A piston ring assembly comprising an annular split expansible ring member of outwardly facing channel section formed of sheet stock having spaced intermediate portions of the web thereof disposed outwardly between the flanges with their ends in spaced relation to the flanges and coacting therewith to provide axially spaced ring element receiving grooves, the portions of the web between the spacer elements and the flanges constituting the bottoms of the grooves, the openings in the web between the adjacent spacer elements constituting drain openings, the flanges constituting cylinder wall engaging elements, and thin annular expansible cylinder wall engaging segments disposed radially edgewise in said grooves, the radial width of the flanges being initially greater than that of the said segments whereby the ring segments are spaced from the bottoms of the grooves during the initial wear-in of the assembly and having chrome plated cylinder wall engaging peripheries.

6. A piston ring assembly comprising an annular split expansible member of outwardly facing channel section formed of sheet steel having spaced intermediate portions of the web thereof disposed outwardly between the flanges with their ends in spaced relation to the flanges and coacting therewith to provide axially spaced cylinder wall engaging ring element receiving grooves, the portions of the web between the spacer elements and the flanges constituting the bottoms of the grooves, the flanges constituting cylinder wall engaging ring elements, and thin annular expansible cylinder wall engaging segments disposed in said grooves.

7. A piston ring assembly comprising an annular split expansible ring member of outwardly facing channel section formed of ribbon steel and having spaced intermediate portions of the web thereof struck radially outwardly between the flanges with at least one of their ends in spaced relation to the flanges and coacting therewith to provide a piston ring element receiving groove, the flanges constituting cylinder wall engaging ring elements, and a thin annular expansible cylinder wall engaging element disposed radially edgewise in said groove.

8. An annular split expansible combined spacer and ring member of outwardly facing channel section formed of ribbon steel having spaced intermediate portions of the web thereof struck outwardly between the flanges with their ends in spaced relation to the flanges and coacting therewith to provide axially spaced ring segment receiving grooves, the portions of the web between the spacer elements and the flanges constituting the bottoms of the grooves, the flanges constituting cylinder wall engaging ring elements, the grooves being adapted to receive thin annular expansible cylinder wall engaging segments disposed radially edgewise.

9. An annular split resilient combined spacer and ring member of outwardly facing channel section formed of ribbon steel having spaced intermediate portions of the web thereof struck outwardly between the flanges with their ends in spaced relation to the flanges and coacting therewith to provide axially spaced ring segment receiving grooves, the portions of the web between the spacer elements and the flanges constituting the bottoms of the grooves, the flanges constituting ring elements and having beveled edges facilitating quick wear-in, the grooves being adapted to receive thin annular resilient ring segments disposed radially edgewise.

HAROLD P. PHILLIPS.

REFERENCES CITED

The following references are of record in the file of this patent:

UNITED STATES PATENTS

| Number | Name | Date |
|---|---|---|
| 2,317,580 | Bauer | Apr. 27, 1943 |
| 2,463,802 | Phillips | Mar. 8, 1949 |
| 2,488,697 | Ackerman | Nov. 22, 1949 |